US011553295B2

(12) United States Patent
Kappus et al.

(10) Patent No.: US 11,553,295 B2
(45) Date of Patent: Jan. 10, 2023

(54) DYNAMIC CAPPING WITH VIRTUAL MICROPHONES (71) Applicant: ULTRALEAP LIMITED, Bristol (GB)

(72) Inventors: Brian Kappus, Campbell, CA (US); Benjamin John Oliver Long, Bristol (GB)

(73) Assignee: Ultraleap Limited, Bristol (GB)

( * ) Notice: Subject to any disclaimer, the term of this patent is extended or adjusted under 35 U.S.C. 154(b) by 0 days.

(21) Appl. No.: 17/068,834

(22) Filed: Oct. 13, 2020

(65) Prior Publication Data
US 2021/0112353 A1  Apr. 15, 2021

Related U.S. Application Data (60) Provisional application No. 62/914,502, filed on Oct. 13, 2019.

(51) Int. Cl.
H04R 29/00  (2006.01)
(52) U.S. Cl.
CPC ................... H04R 29/006 (2013.01)
(58) Field of Classification Search
CPC ............... H04R 29/006; G10K 11/34
USPC .......................................................... 381/58
See application file for complete search history.

(56) References Cited

U.S. PATENT DOCUMENTS

| 4,218,921 | A | 8/1980 | Berge |
| 4,771,205 | A | 9/1988 | Mequio |
| 4,881,212 | A | 11/1989 | Takeuchi |
| 5,226,000 | A | 7/1993 | Moses |
| 5,243,344 | A | 9/1993 | Koulopoulos |
| 5,329,682 | A | 7/1994 | Thurn |
| 5,422,431 | A | 6/1995 | Ichiki |
| 5,426,388 | A | 6/1995 | Flora |
| 5,477,736 | A | 12/1995 | Lorraine |
| 5,511,296 | A | 4/1996 | Dias |
| 5,859,915 | A | 1/1999 | Norris |
| 6,029,518 | A | 2/2000 | Oeftering |
| 6,193,936 | B1 | 2/2001 | Gardner |
| 6,436,051 | B1 | 8/2002 | Morris |
| 6,503,204 | B1 | 1/2003 | Sumanaweera |

(Continued)

FOREIGN PATENT DOCUMENTS

| CA | 2470115 A1 | 6/2003 |
| CN | 101986787 | 3/2011 |

(Continued)

OTHER PUBLICATIONS

Aoki et al., Sound location of stero reproduction with parametric loudspeakers, Applied Acoustics 73 (2012) 1289-1295 (7 pages).

(Continued)

Primary Examiner — Paul Kim
(74) Attorney, Agent, or Firm — Koffsky Schwalb LLC; Mark I. Koffsky (57) ABSTRACT Estimating the field strength from an ultrasonic phased array can be done by summing the contribution of each transducer to the point of interest. Since this contribution is already calculated when creating a converging spherical wave, it can be reused to add a virtual microphone to the system. By monitoring this microphone and moving it along with new focus points, a robust system of field estimates and regulation may be established.

18 Claims, 4 Drawing Sheets (56) References Cited

U.S. PATENT DOCUMENTS

| | | |
|---|---|---|
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,369,973 B2 | 2/2013 | Risbo |
| 8,607,922 B1 | 12/2013 | Werner |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,523,159 B2 | 12/2019 | Megretski |
| 10,531,212 B2 | 1/2020 | Long |
| 10,569,300 B2 | 2/2020 | Hoshi |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 11,048,329 B1 | 6/2021 | Lee |
| 11,098,951 B2 | 8/2021 | Kappus |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 2001/0033124 A1 | 10/2001 | Norris |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0212760 A1 | 9/2005 | Marvit |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0094317 A1 | 4/2007 | Wang |
| 2007/0177681 A1 | 8/2007 | Choi |
| 2007/0263741 A1 | 11/2007 | Erving |
| 2008/0012647 A1 | 1/2008 | Risbo |
| 2008/0084789 A1 | 4/2008 | Altman |
| 2008/0130906 A1* | 6/2008 | Goldstein .............. A61B 5/121 |
| | | 381/58 |
| 2008/0226088 A1 | 9/2008 | Aarts |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0269207 A1 | 9/2014 | Baym |
| 2014/0269208 A1 | 9/2014 | Baym |
| 2015/0002477 A1 | 1/2015 | Cheatham, III |
| 2015/0005039 A1 | 1/2015 | Liu |
| 2015/0006645 A1 | 1/2015 | Oh |

(56) References Cited

U.S. PATENT DOCUMENTS

| | | |
|---|---|---|
| 2015/0007025 A1 | 1/2015 | Sassi |
| 2015/0013023 A1 | 1/2015 | Wang |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0220199 A1 | 8/2015 | Wang |
| 2015/0226537 A1 | 8/2015 | Schorre |
| 2015/0226831 A1 | 8/2015 | Nakamura |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0279951 A1 | 9/2017 | Hwang |
| 2017/0336860 A1 | 11/2017 | Smoot |
| 2017/0366908 A1 | 12/2017 | Long |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1* | 6/2018 | Long ................ G10K 11/008 |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0267156 A1 | 9/2018 | Carter |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1* | 6/2019 | Long ................ G10K 11/346 |
| 2019/0204925 A1 | 7/2019 | Long |
| 2019/0206202 A1 | 7/2019 | Carter |
| 2019/0235628 A1* | 8/2019 | Lacroix ............. G06F 3/0488 |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082804 A1 | 3/2020 | Kappus |
| 2020/0103974 A1 | 4/2020 | Carter |
| 2020/0117229 A1 | 4/2020 | Long |
| 2020/0193269 A1 | 6/2020 | Park |
| 2020/0218354 A1 | 7/2020 | Beattie |
| 2020/0302760 A1 | 9/2020 | Carter |
| 2020/0320347 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0109712 A1 | 4/2021 | Oliver |
| 2021/0111731 A1 | 4/2021 | Oliver |
| 2021/0141458 A1 | 5/2021 | Sarafianou |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Iodice |
| 2022/0329250 A1 | 10/2022 | Long |

FOREIGN PATENT DOCUMENTS

| | | |
|---|---|---|
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |

(56) References Cited

FOREIGN PATENT DOCUMENTS

| | | |
|---|---|---|
| JP | 2010109579 | 5/2010 |
| JP | 2011172074 | 9/2011 |
| JP | 2012048378 | 3/2012 |
| JP | 2012048378 A | 3/2012 |
| JP | 2015035657 A | 2/2015 |
| JP | 2016035646 | 3/2016 |
| KR | 20120065779 | 6/2012 |
| KR | 20130055972 | 5/2013 |
| KR | 20160008280 | 1/2016 |
| KR | 20200082449 A | 7/2020 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2014181084 A1 | 11/2014 |
| WO | 2015006467 | 1/2015 |
| WO | 2015039622 | 3/2015 |
| WO | 2015127335 | 8/2015 |
| WO | 2016007920 | 1/2016 |
| WO | 2016095033 A1 | 6/2016 |
| WO | 2016099279 | 6/2016 |
| WO | 2016132144 | 8/2016 |
| WO | 2016137675 | 9/2016 |
| WO | 2016162058 | 10/2016 |
| WO | 2017172006 | 10/2017 |
| WO | 2020049321 A2 | 3/2020 |

OTHER PUBLICATIONS

Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Bortoff et al., Pseudolinearization of the Acrobot using Spline Functions, IEEE Proceedings of the 31st Conference on Decision and Control, Sep. 10, 1992 (6 pages).
Corrected Notice of Allowability dated Jan. 14, 2021 for U.S. Appl. No. 15/897,804 (pp. 1-2).
ISR and WO for PCT/GB2020/052544 (dated Dec. 18, 2020) (14 pages).
ISR and WO for PCT/GB2020/052545 (dated Jan. 27, 2021) (14 pages).
ISR and WO for PCT/GB2020/052829 (dated Feb. 1, 2021) (15 pages).
Office Action dated Dec. 7, 2020 for U.S. Appl. No. 16/563,608 (pp. 1-8).
Office Action dated Mar. 11, 2021 for U.S. Appl. No. 16/228,767 (pp. 1-23).
Search Report by EPO for EP 17748466 dated Jan. 13, 2021 (16 pages).
Wang et al., Device-Free Gesture Tracking Using Acoustic Signals, ACM MobiCom '16, pp. 82-94 (13 pages).
"Welcome to Project Soli" video, https://atap.google.com/#project-soli Accessed Nov. 30, 2018, 2 pages.
A. Sand, Head-Mounted Display with Mid-Air Tactile Feedback, Proceedings of the 21st ACM Symposium on Virtual Reality Software and Technology, Nov. 13-15, 2015 (8 pages).
Alexander, J. et al. (2011), Adding Haptic Feedback to Mobile TV (6 pages).
Ashish Shrivastava et al., Learning from Simulated and Unsupervised Images through Adversarial Training, Jul. 19, 2017, pp. 1-16.
Benjamin Long et al., "Rendering volumetric haptic shapes in mid-air using ultrasound", ACM Transactions on Graphics (TOG), Acm, US, (Nov. 19, 2014), vol. 33, No. 6, ISSN 0730-0301, pp. 1-10.
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Corrected Notice of Allowability dated Jun. 21, 2019 for U.S. Appl. No. 15/966,213 (2 pages).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
Diederik P. Kingma et al., Adam: A Method for Stochastic Optimization, Jan. 30, 2017, pp. 1-15.
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gavrilov L R et al. (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on (56) References Cited

OTHER PUBLICATIONS

Computer Vision and Pattern Recognition Workshop, Date of Conference: Jun. 27-Jul. 2, 2004, 9 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Hilleges et al. Interactions in the air: adding further depth to interactive tabletops, UIST '09: Proceedings of the 22nd annual ACM symposium on User interface software and technology Oct. 2009 pp. 139-148.
Hoshi T et al., "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
Hua J, Qin H., Haptics-based dynamic implicit solid modeling, IEEE Trans Vis Comput Graph. Sep.-Oct. 2004;10(5):574-86.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for Application No. PCT/GB2018/053738, dated Apr. 11, 2019, 14 pages.
International Search Report and Written Opinion for Application No. PCT/GB2018/053739, dated Jun. 4, 2019, 16 pages.
International Search Report and Written Opinion for Application No. PCT/GB2019/050969, dated Jun. 13, 2019, 15 pages.
International Search Report and Written Opinion for Application No. PCT/GB2019/051223, dated Aug. 8, 2019, 15 pages.
International Search Report and Written Opinion for Application No. PCT/GB2019/052510, dated Jan. 14, 2020, 25 pages.
ISR and WO for PCT/GB2020/050013 (dated Jul. 13, 2020) (20 pages).
ISR and WO for PCT/GB2020/050926 (dated Jun. 2, 2020) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al., "Two-dimensional Scanning Tactile Display using Ultrasound Radiation Pressure", Haptic Interfaces for Virtual Environment and Teleoperator Systems, 20 06 14th Symposium on Alexandria, VA, USA Mar. 25-26, 2006, Piscataway, NJ, USA,IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated 10 pages, dated Mar. 31, 2019.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
K. Jia, Dynamic properties of micro-particles in ultrasonic transportation using phase-controlled standing waves, J. Applied Physics 116, n. 16 (2014) (12 pages).
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" WESPAC IX 2006 (8 pages).
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Sysgtems (NIPS 2016), Barcelona, Spain. Aug. 22, 2016, pp. 1-15.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
M. Barmatz et al., "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahdi Rad et al., Feature Mapping for Learning Fast and Accurate 3D Pose Inference from Synthetic Images, Mar. 26, 2018, pp. 1-14.
Marco A B Andrade et al., "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: I0.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mueller, GANerated Hands for Real-Time 3D Hand Tracking from Monocular RGB, Eye in-Painting with Exemplar Generative Adverserial Networks, pp. 49-59 (Jun. 1, 2018).

(56) References Cited

OTHER PUBLICATIONS

Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 (Year: 2010), 20 pages.
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 17, 2020 for U.S. Appl. No. 15/210,661 (pp. 1-9).
Notice of Allowance dated May 30, 2019 for U.S. Appl. No. 15/966,213 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Notice of Allowances dated Oct. 1, 2020 for U.S. Appl. No. 15/897,804 (pp. 1-9).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pags 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 22, 2019 for U.S. Appl. No. 16/160,862 (pp. 1-5).
Office Action dated Dec. 11, 2019 for U.S. Appl. No. 15/959,266 (pp. 1-15).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Mar. 20, 2020 for U.S. Appl. No. 15/210,661 (pp. 1-10).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
OGRECave/ogre—GitHub: ogre/Samples/Media/materials at 7de80a7483f20b50f2b10d7ac6de9d9c6c87d364, Mar. 26, 2020, 1 page.
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al., "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, dated Apr. 12, 2019, 14 pages.
Partial ISR for Application No. PCT/GB2020/050013 dated May 19, 2020 (16 pages).
PCT Partial International Search Report for Application No. PCT/GB2018/053404 dated Feb. 25, 2019, 13 pages.
Péter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rocchesso et al., Accessing and Selecting Menu Items by In-Air Touch, ACM CHItaly'19, Sep. 23-25, 2019, Padova, Italy (9 pages).
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).

(56) References Cited

OTHER PUBLICATIONS

Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Sylvia Gebhardt, Ultrasonic Transducer Arrays for Particle Manipulation (date unknown) (2 pages).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-362.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145—Jun. 15, 2004, pp. 1-10.
Tom Carter et al., "UltraHaptics: Multi-Point Mid-Air Haptic Feedback for Touch Surfaces", Proceedings of the 26th Annual ACM Symposium on User Interface Software and Technology, UIST'13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Vincent Lepetit et al., Model Based Augmentation and Testing of an Annotated Hand Pose Dataset, ResearchGate, https://www.researchgate.net/publication/307910344, Sep. 2016, 13 pages.
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al., "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al., "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al., "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted 5/15; published 4/16.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the authors), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
EPO Examination Search Report 17 702 910.5 (dated Jun. 23, 2021).
Office Action dated Oct. 29, 2021 for U.S. Appl. No. 16/198,959 (pp. 1-7).
Notice of Allowance dated Nov. 5, 2021 for U.S. Appl. No. 16/899,720 (pp. 1-9).
Corrected Notice of Allowability dated Nov. 24, 2021 for U.S. Appl. No. 16/600,500 (pp. 1-5).
International Search Report and Written Opinion for App. No. PCT/GB2021/051590, dated Nov. 11, 2021, 20 pages.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Office Action (Notice of Allowance and Fees Due (PTOL-85)) dated Dec. 14, 2021 for U.S. Appl. No. 17/170,841 (pp. 1-8).
Office Action (Non-Final Rejection) dated Dec. 20, 2021 for U.S. Appl. No. 17/195,795 (pp. 1-7).
EPO Application 18 725 358.8 Examination Report dated Sep. 22, 2021.
EPO 21186570.4 Extended Search Report dated Oct. 29, 2021.
A. B. Vallbo, Receptive field characteristics of tactile units with myelinated afferents in hairy skin of human subjects, Journal of Physiology (1995), 483.3, pp. 783-795.
Amanda Zimmerman, The gentle touch receptors of mammalian skin, Science, Nov. 21, 2014, vol. 346 Issue 6212, p. 950.
Corrected Notice of Allowability dated Aug. 9, 2021 for U.S. Appl. No. 15/396,851 (pp. 1-6).
Henrik Bruus, Acoustofluidics 2: Perturbation theory and ultrasound resonance modes, Lab Chip, 2012, 12, 20-28.
Hyunjae Gil, Whiskers: Exploring the Use of Ultrasonic Haptic Cues on the Face, CHI 2018, Apr. 21-26, 2018, Montreal, QC, Canada.
India Morrison, The skin as a social organ, Exp Brain Res (2010) 204:305-314.
JonasChatel-Goldman, Touch increases autonomic coupling between romantic partners, Frontiers in Behavioral Neuroscience Mar. 2014, vol. 8, Article 95.
Kai Tsumoto, Presentation of Tactile Pleasantness Using Airborne Ultrasound, 2021 IEEE World Haptics Conference (WHC) Jul. 6-9, 2021. Montreal, Canada.

(56) References Cited

OTHER PUBLICATIONS

Keisuke Hasegawa, Electronically steerable ultrasound-driven long narrow airstream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,, Curved acceleration path of ultrasound-driven airflow, J. Appl. Phys. 125, 054902 (2019).
Line S Loken, Coding of pleasant touch by unmyelinated afferents in humans, Nature Neuroscience vol. 12 [ No. 5 [ May 2009 547.
Mariana von Mohr, The soothing function of touch: affective touch reduces feelings of social exclusion, Scientific Reports, 7: 13516, Oct. 18, 2017.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Notice of Allowance dated Jul. 22, 2021 for U.S. Appl. No. 16/600,500 (pp. 1-9).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 9, 2021 for U.S. Appl. No. 17/068,825 (pp. 1-9).
Office Action dated Sep. 16, 2021 for U.S. Appl. No. 16/600,496 (pp. 1-8).
Office Action dated Sep. 24, 2021 for U.S. Appl. No. 17/080,840 (pp. 1-9).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Takaaki Kamigaki, Noncontact Thermal and Vibrotactile Display Using Focused Airborne Ultrasound, EuroHaptics 2020, LNCS 12272, pp. 271-278, 2020.
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Hoshi et al.,Tactile Presentation by Airborne Ultrasonic Oscillator Array, Proceedings of Robotics and Mechatronics Lecture 2009, Japan Society of Mechanical Engineers; May 24, 2009 (5 pages).
ISR & WO for PCT/GB2020/052545 (dated Jan. 27, 2021) 14 pages.
ISR for PCT/GB2020/052546 (dated Feb. 23, 2021) (14 pages).
ISR for PCT/GB2020/053373 (dated Mar. 26, 2021) (16 pages).
Notice of Allowance dated Apr. 20, 2021 for U.S. Appl. No. 16/563,608 (pp. 1-5).
Notice of Allowance dated Jun. 10, 2021 for U.S. Appl. No. 17/092,333 (pp. 1-9).
Notice of Allowance dated Jun. 25, 2021 for U.S. Appl. No. 15/396,851 (pp. 1-10).
Office Action dated Jun. 25, 2021 for U.S. Appl. No. 16/899,720 (pp. 1-5).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Communication Pursuant to Article 94(3) EPC for EP 19723179.8 (dated Feb. 15, 2022), 10 pages.
EPO ISR and WO for PCT/GB2022/050204 (dated Apr. 7, 2022) (15 pages).
IN 202047026493 Office Action dated Mar. 8, 2022, 6 pages.
ISR & WO For PCT/GB2021/052946, 15 pages.
Office Action (Final Rejection) dated Mar. 14, 2022 for U.S. Appl. No. 16/564,016 (pp. 1-12).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).
Office Action (Notice of Allowance and Fees Due (PTOL-85)) dated Mar. 7, 2022 for U.S. Appl. No. 16/600,496 (pp. 1-5).
https://radiopaedia.org/articles/physical-principles-of-ultrasound-1?lang=gb (Accessed May 29, 2022).
Azad et al., Deep domain adaptation under deep label scarcity. arXiv preprint arXiv: 1809.08097 (2018) (Year: 2018).
Wang et al., Few-shot adaptive faster r-cnn. In Proceedings of the IEEE/CVF Conference on Computer Vision and Pattern Recognition, pp. 7173-7182 2019 (Year: 2019).
Der et al., Inverse kinematics for reduced deformable models. ACM Transactions on graphics (TOG) 25, No. 3 (2006): 1174-1179 (Year: 2006).
Seo et al., "Improved numerical inverse kinematics for human pose estimation," Opt. Eng. 50(3 037001 (Mar. 1, 2011) https://doi.org/10.1117/1.3549255 (Year: 2011).
Boureau et al., "A theoretical analysis of feature pooling in visual recognition." In Proceedings of the 27th international conference on machine learning (ICML-10), pp. 111-118. 2010. (Year: 2010).
Duka, "Neural network based inverse kinematics solution for trajectory tracking of a robotic arm." Procedia Technology 12 (2014) 20-27. (Year: 2014).
Almusawi et al., "A new artificial neural network approach in solving inverse kinematics of robotic arm (denso vp6242)." Computational intelligence and neuroscience 2016 (2016). (Year: 2016).
Oikonomidis et al., "Efficient model-based 3D tracking of hand articulations using Kinect." In BmVC, vol. 1, No. 2, p. 3. 2011. (Year: 2011).
Office Action (Non-Final Rejection) dated May 25, 2022 for U.S. Appl. No. 16/843,281 (pp. 1-28).
Certon, D., Felix, N., Lacaze, E., Teston, F., & Patat, F. (2001). Investigation of cross-coupling in 1-3 piezocomposite arrays, ieee transactions on ultrasonics, ferroelectrics, and frequency control, 48(1), 85-92.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
DeSilets, C. S. (1978). Transducer arrays suitable for acoustic imaging (No. GL-2833). Stanford Univ CA Edward L Ginzton Lab of Physics.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In (56) References Cited

OTHER PUBLICATIONS

Inter-Noise and Noise-Con Congress and Conference Proceedings (vol. 259, No. 4, pp. 5720-5731). Institute of Noise Control Engineering.
Henneberg, J., Geriach, A., Storck, H., Cebulla, H., & Marburg, S. (2018). Reducing mechanical cross-coupling in phased array transducers using stop band material as backing Journal of Sound and Vibration, 424, 352-364.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Beranek, L., & Mellow, T. (2019). Acoustics: Sound Fields, Transducers and Vibration. Academic Press.
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Chang Suk Lee et al., An electrically switchable visible to infra-red dual frequency cholesteric liquid crystal light shutter, J. Mater. Chem. C, 2018, 6, 4243 (7 pages).
EPO Communication for Application 18 811 906.9 (dated Nov. 29, 2021) (15 pages).
EPO Examination Report 17 748 4656.4 (dated Jan. 12, 2021) (16 pages).
Gareth Young et al.. Designing Mid-Air Haptic Gesture Controlled User Interfaces for Cars, PACM on Human-Computer Interactions, Jun. 2020 (24 pages).
ISR and WO for PCT/GB2020/052829 (dated Feb. 10, 2021) (15 pages).
ISR and WO for PCT/GB2021/052415 (dated Dec. 22, 2021) (16 pages).
Mohamed Yacine Tsalamlal, Non-Intrusive Haptic Interfaces: State-of-the Art Survey, HAID 2013, LNCS 7989, pp. 1-9, 2013.
Office Action (Non-Final Rejection) dated Jan. 24, 2022 for U.S. Appl. No. 16/228,767 (pp. 1-22).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Non-Final Rejection) dated Aug. 29, 2022 for U.S. Appl. No. 16/995,819 (pp. 1-6).
ISR & WO for PCT/GB2022/051388 (Aug. 30, 2022) (15 pages).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Sep. 8, 2022 for U.S. Appl. No. 17/176,899 (pp. 1-8).
Office Action (Final Rejection) dated Sep. 16, 2022 for U.S. Appl. No. 16/404,660 (pp. 1-6).
Office Action (Non-Final Rejection) dated Sep. 21, 2022 for U.S. Appl. No. 17/721,315 (pp. 1-10).

* cited by examiner

DYNAMIC CAPPING WITH VIRTUAL MICROPHONES

PRIOR APPLICATIONS

This application claims the benefit of U.S. Provisional Patent Application No. 62/914,502 filed on Oct. 13, 2019, which is incorporated by reference in its entirety.

The prior application U.S. application Ser. No. 15/960,113 filed on Apr. 23, 2018 is incorporated by reference in its entirety.

The prior application U.S. Application No. 62/507,822 filed on May 18, 2017 is incorporated by reference in its entirety.

FIELD OF THE DISCLOSURE

The present disclosure relates generally to add a virtual microphone to an ultrasound phased array system.

BACKGROUND

A goal of this disclosure is to produce an estimate of the acoustic pressure from an ultrasound phased array that reasonably matches the measurement of a stationary or slow-moving microphone at a similar location.

There are methods that detail ways to calculate instantaneous pressure or intensity or other metrics in the field. Here, a series of algorithms efficiently use computational resources to calculate time-averaged metrics. These are useful for determining and regulating hot spots and higher-than desired pressure.

SUMMARY

Estimating the field strength from an ultrasonic phased array can be done via a processor by summing the contribution of each transducer to the point of interest. This contribution is already calculated when creating a converging spherical wave. This calculation can be reused to add a virtual microphone to the system. By monitoring this microphone and moving it along with new focus points, a robust system of field estimates and regulation may be established.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Virtual Microphones

The pressure output of an n-sized array of these transducers at point x, relative to the center of the array, can be then written as, $$P_{tot}(x) = \Sigma_n X_n P_n(x - y_n), \quad (1)$$

where $y_n$ is the offset of each transducer relative to the center of the array, $P_n$ is a function/model which gives the complex pressure output at given vector relative to the transducer, and $X_n$ represents a complex activation coefficient for each transducer. A subscript n is included in the pressure function to allow for potentially different transducers within an array. The activation coefficient can elicit a phase shift, amplitude change, or both and manipulating these coefficients controls the acoustic field. In a real system this is interpreted into an amplitude and phase to drive each transducer.

An important field from an array for haptics is that of a spherical wave front converging on a focus point. If we compose a list of pressure values from each transducer at point x relative to the center of the array, $A_n = P_n(x - y_n)$, the trivial activation solution is:

$$X_n = \frac{A_n^*}{\Sigma_k |A_k|^2} b,$$

where b is the desired complex pressure at the focal point. If we declare $A_n = A$ as a row-vector and $X_n = X$ a column vector, another way to write equation 1 is:

$$A \cdot X = b.$$

Calculating the row-vector A is part of constructing this field solution. When the focal point is moved, the system produces a new $A = A'$, a new $X = X'$, and the system moves on with making new focal point locations. The key here is to recognize the significance of $A \cdot X'$, the old row-vector multiplied by the current activation vector. The output of this multiplication is an estimate of the pressure at the old focus location with the new activation coefficients. With one extra vector multiply, the system can estimate of the pressure at a specific point in space (in this case an older focus location) produced by the current field it is rendering. By storing the old A and performing $A \cdot X'$ each time the activation coefficients are updated we have a field estimate (virtual microphone or for brevity 'mic') at the previous focus location with a minimum of extra computation needed.

Unlimited virtual microphones can be created—either at previous focus locations or using $A_n = P_n(x - y_n)$ to interrogate a new x, unrelated to past fields. Every new microphone, however, requires a dot product vector-by-vector multiplication each time its pressure is to be updated. Therefore, it is not computationally efficient to investigate every point in the field. For a mid-air haptic application, it is most useful to be near focal points. Haptic curves only produce a sensation when they are repeated many times—this gives a guide as to where possible high-pressure points are=along points that have been visited before.

With this in mind, in one arrangement of this disclosure, we update the location of the virtual microphone as the array focuses to new locations. In this case we 'move' the mic to the current focus location by overwriting the stored A with the current calculated A'. Any moving averages (explained below) are retained and proceed with the new location and associated row-vector. The decision of when-to-move can involve threshold pressure, an external flag, or any other signal. One example is a simple count-down of timesteps, here deemed Δn. Rather than a fixed value after every move, including a random component prevents locking into a location if the field is repeating locations with a consistent frequency. If Δn is a fixed value then loops which are an integer multiple of Δn cause the moving mic to be locked into only a few points, possibly missing higher-pressure regions of a repeated curve. To remedy this, Δn can com- posed of a fixed minimum-n ($n_{fixed}$) and an additional random-length ($n_{random}$). By making $n_{random}$ equal to or larger than $n_{fixed}$, the moving mic can equally sample curves of arbitrary length.

II. Moving Averages

A moving average is a calculation which smooths input. This is essential to even out random noise but is also useful to develop metrics for sinusoidal signals. In acoustics, for instance, calculating the energy contained in a monochro- matic wave is achieved by averaging the instantaneous pressure squared over the course of one period. For a complex signal composed of many frequencies, a single, repeating period is long or does not exist. Calculating instantaneous pressure-squared would over-estimate the energy in the sound field. To compensate for this, we can use moving averages to include adjacent values and develop a metric relevant to the energy in the acoustic wave.

One method to calculate a moving average is called a "box filter". This is implemented by averaging a series of points in a signal. As new points are acquired, old points are forgotten, and a new average is calculated. Another way to look at this is with convolution. Convolution takes a kernel, or a series of weights, and multiplies those weights by the input signal, where each point in the kernel is multiplied by the input based delayed equally to its position in the kernel array, and then performs a sum as its output. The "box filter" moving average kernel, for instance, is simply a series of equal-valued variables equal to 1/n where n is the size of the kernel.

Another method to calculate a moving average is a recursive implementation whereby the last calculated value of the average is used, along with new data, to calculated subsequent points. One particular recursive calculation which is relatively easy to implement is an exponentially weighted rolling average. This method is described by, $$Avg_n = (1-\alpha) Avg_{n-1} + \alpha x, \quad (2)$$

where $Avg_n$ is the current rolling average, $Avg_{n-1}$ is the calculated average from the previous iteration, x is the new input, and α is a constant. The constant α determines the exponential weighting in units of the sampling rate.

A particular metric often used in acoustics is known as sound-pressure-level (SPL), expressed in decibels (re 20 microPascals). This is calculated through the square root of the exponentially weighted moving average value of pres- sure squared (rolling root-mean-squared (RMS) value). Time constants used for the exact calculation vary from a few milliseconds to several seconds depending on the appli- cation and engineering specification.

This metric can be tracked using virtual microphones by keeping a rolling average of the pressure-squared value (mean-squared) and taking the root when a decibel value is needed. This value can be used to regulate (attenuate) the array output if desired. Alternatively, pressure-squared units can be tracked and used as the regulatory value. Since the square-root is a single-valued function, the resulting SPL value will be correctly bounded.

Calculating the exponentially weighted average of P-squared (squared pressure output) ($\overline{P^2}$) using discrete time-steps can be accomplished with a recursive algorithm, $$\overline{P^2}(n) = \alpha P^2 + (1-\alpha) \overline{P^2}(n-1),$$

where $\overline{P^2}(n-1)$, is the output from the previous timestep, $P^2$ is the square of the pressure at the current timestep, and α is a constant between zero and one. The constant α repre- sents the exponential time-constant in timestep units. For instance, a 1-second integration constant running at 40 kHz would be given by $$\alpha = \frac{1}{40000}.$$

This would average points 1-second in the past by 1/e relative to the current point. Points 2-seconds in the past would be weighted by $(1/e)^2$ and so on.

The same approach may be taken with an energy metric, which is based on the simulation of acoustic intensity. The calculation of an energy metric involves going back to the initial computation of A·X'. Each component of the vector particle velocity of the medium may be calculated for a single source by a multiplication of the pressure with the relevant component of the wavefront normal vector divided through by the acoustic impedance. As each element is modelled as a spherical wave source the wavefront normal vector is simply:

$$\hat{n}_n = \frac{x - y_n}{\|x - y_n\|},$$

As $A_n$ is $P_n(x-y_n)$, the vector particle velocity of the medium neglecting the division by the constant acoustic impedance of air, may be calculated for each element as $\hat{n}_n P_n(x-y_n)$. If these normal directions are retained alongside A, they may be incorporated into the row-vector as $A_{n,x}$, $A_{n,y}$, and $A_{n,z}$. As these are also linear quantities these may be summed and reconstructed as $A_{n,x}\cdot X'$, $A_{n,y}\cdot X'$ and $A_{n,z}\cdot X'$. The acoustic intensity vector (again neglecting constant terms involving acoustic impedance), whose magnitude describes the total energy of the acoustic wave at a point, can then be written as:

$$I = A \cdot X' \cdot \begin{bmatrix} A_{n,x} \cdot X' \\ A_{n,y} \cdot X' \\ A_{n,z} \cdot X' \end{bmatrix},$$

This provides a measurement of the total energy of the wave which may be used in the place of pressure. As the energy has units proportional to P-squared, the rolling average of 1 per equation 2 represents a true energy metric. This is in contrast to the P-squared which for SPL requires a square-root to give a root-mean-squared (RMS) value.

For situations with lower sample rate (or when the mic averages are not updated every cycle) α needs to be adjusted

III. Dual Mic Arrangement

There exists a class of curves with self-crossings (or crossings from other points/grating lobes) where the moving-mic arrangement presented above can mis-represent the highest-pressure point in the path by as much as 6 dB. To remedy this, we can divide the problem into two separate virtual mics—one which always moves as above, and another which locks onto a given point until the moving mic has found a higher-pressure location. In this way, the moving mic, from here called the "seek" mic, samples the path until a hotspot has been found, at which point the locking mic, from here called the "regulation" mic, moves to that point. As long as that point is the "hottest" in the field, it will stay there and correctly estimate the maximum pressure one could measure. Only when the path has changed (and stopped contributing to the "hotspot") will the seek mic be able to pull the regulation mic to a new location.

The seek mic is able to detect hotspots quickly because it will be using a larger alpha for its rolling average. Functionally, this creates a situation where its rolling average is more weighted towards the recent past relative to the small alpha. A hotspot occurs when the motion of a focus point is slowed, or the array focus returns near the virtual mic after a short period. With the larger alpha, seek mic approaches the true (long-term) P-squared value more quickly than a regulation-alpha mic would and sees a spike at the hotspot. A regulation-mic move is initiated when the large-alpha P-squared exceeds the regulation-alpha P-squared of the regulation mic by some margin. The regulation mic's P-squared is then set to the seek-mic P-squared, basically setting a new (higher) bar for further movement. If the regulation mic did indeed get placed on a hotspot then its small-alpha P-squared will continue to increase and be out of reach of the large-alpha P-squared of the seek mic until the system changes paths. If the move did not put the regulation mic on a hotspot then its P-squared will decay until it is moved again.

In this system we still need two more rolling averages. The first is a small-alpha P-squared which is not adjusted when the regulation mic is moved. This is necessary because without it we do not have an estimate which represents the pressure that would be measured by a stationary mic. The regulation-alpha P-squared which is overwritten by the large-alpha seek mic P-squared changes much more quickly and only serves as a comparison for a movement decision. By keeping a second regulation-alpha P-squared which is not overwritten, the system has an estimate of the pressure with which to dictate regulation.

The last P-squared needed is calculated using the seek mic location (the output of its pressure estimate) but is averaged using the small-alpha regulation mic time constant. This effectively gives the moving-mic P-squared average achieved using only a single moving virtual microphone. For a certain class of curves this value represents a better estimate of the path pressure than the regulation mic P-squared.

Figure 1:
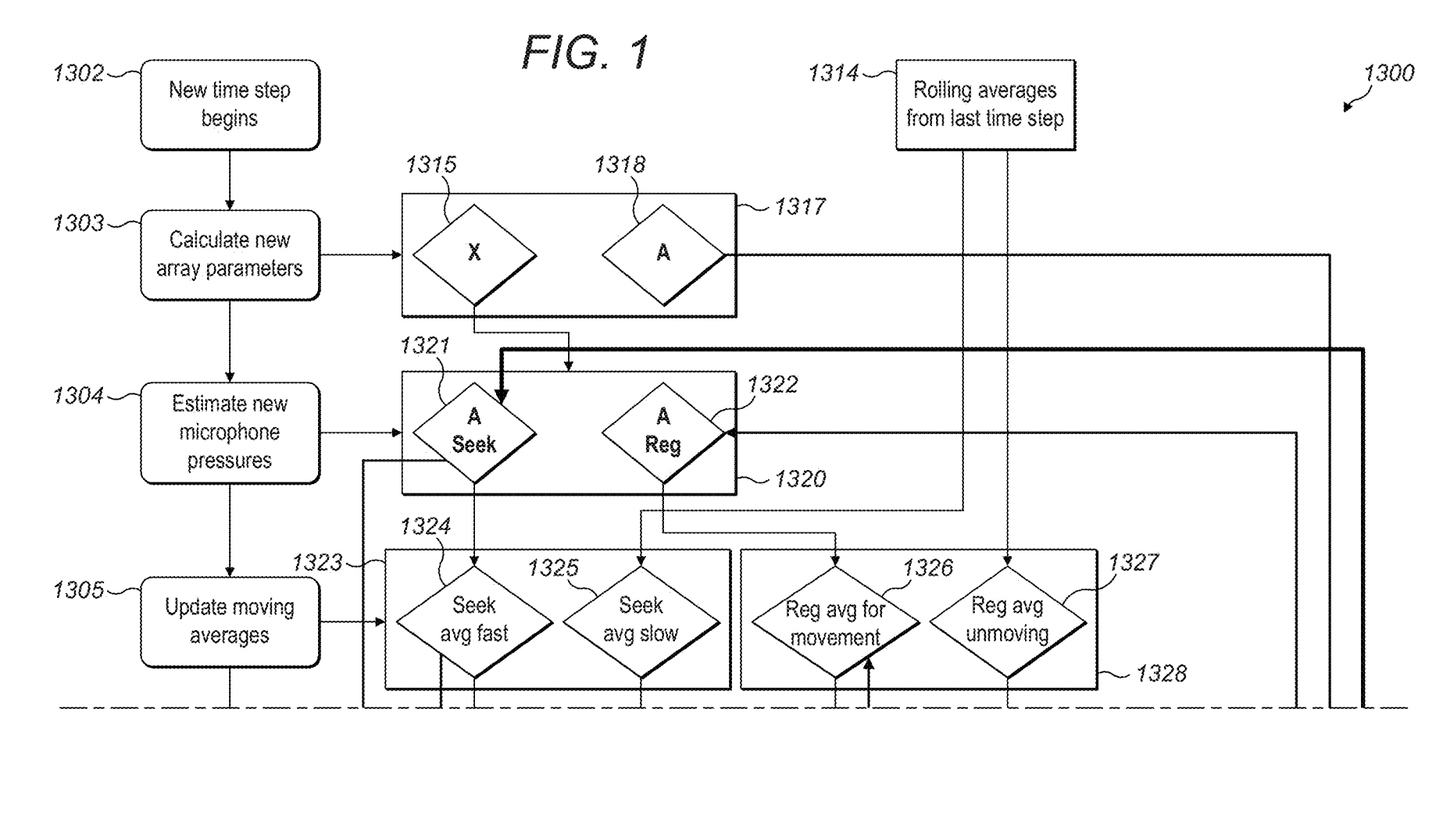
FIG. 1 shows a flowchart of a dual-mic arrangement.

Turning to FIG. 1, shown is a diagram 1300 of the decision tree for a dual mic arrangement. A new time step begins 1302 following by calculating new array parameters 1303. These parameters are then provided to the vectors 1317 (row vector A 1316 and column vector X 1315). The row vector A 1316 is provided to overwrite A_seek with A and reset move counter with a fixed minimum-n ($n_{fixed}$) plus additional random-length ($n_{random}$) 1311. The column vector X 1315 is provided to a group of A vectors 1320 (A_seek 1321 and A_reg 1322).

Calculating new array parameters 1303 are also provided to estimate new microphone pressures 1304, which is provided to the group of A vectors 1320. A_seek 1321 is provided to an avg group 1323 consisting of seek avg fast 1324 and seek avg slow 1325. A_reg 1322 is provided to a reg group 1328 consisting of reg avg for movement 1326 and reg avg unmoving 1327. The seek avg slow 1325 and reg avg unmoving 1327 are compared and the largest value is taken for regulation 1329.

The A_seek 1321 is sent to overwrite A_reg with A_seek and overwrite Reg avg for movement with seek avg fast 1312 and is then sent to A_reg 1322.

The seek avg fast 1324 is sent to overwrite A_reg with A_seek and overwrite Reg avg for movement with seek avg fast 1312 and is then sent to the reg avg for movement 1326.

The values from seek avg fast 1324 and reg avg for movement 1326 are compared to determine which one is greater (with margin) 1313; the result is sent to overwrite Reg avg for movement with seek avg fast 1312 and then to Reg avg for movement 1326.

The values of estimate new microphone pressures 1304 are provided to update the moving averages 1305, which is provided to: 1) the avg group 1323; and the move decision for Reg mic 1306 and then to the move decision for Seek mic 1307.

The counter is moved from the last step 1308 and then decremented 1309. If the counter is less than or equal to zero 1310, an instruction is sent to overwrite A_seek with A and reset move counter with a fixed minimum-n ($n_{fixed}$) plus additional random-length ($n_{random}$) 1311.

Rolling averages from the last time step 1314 are provided to the avg group 1323 and the reg group 1328.

In some implementations of the system there exists time where the seek microphone might be calculating an average but due to propagation delay, the regulation mic might not be able to move to that location for several time steps. In that case, one solution is to stop averaging the seek mic into the moving average when the regulation mic is not able to move to that location. This introduces a "blind spot" for those particular points (especially if they happen on a regular basis). Since the movement of the seek mic is adjusted with a random factor, however, even a regular 'blind spot' should be distributed throughout any regular curve and not represent a hole in the measurement. Excessive lack of measurement represents degraded performance for finding hot-spots and should be minimized.

IV. N-Mic Arrangement

In order to find a hotspot, the seek mic still needs to randomly land on that point. For some design parameters (peak pressure possible, regulation pressure, Δn, etc) this can take a considerable amount of time. This time can be reduced by adding more seek mics for a given focus point. Each keeps its own P-squared values and move counters. At every time step, the regulation mic would compare its P-squared to all of the seek mics and move if any of them best it. With more points being checked simultaneously, a hotspot will be found more quickly.

Ideally, every seek mic is measuring at a different physical location. Practically, this is difficult to guarantee because the physical location of the mic is not stored and even if it were, the comparison to every other mic takes computation. One solution is to simply guarantee that no two mics are moved on the same timestep. If two move counters expire at the same time, move one mic and add some value to the move counter of the other. This can be 1 at minimum or some other (possibly random) value based upon the number of other mics in the system.

In addition to mics, the system may include any number of averages (with different alphas) per microphone. This could be used, for example, to switch to different time-constants for regulation on the fly. Some could be overwritten for a move while others are held. This yields a more flexible system with regards to possible fluctuations. For instance, a short-time alpha reacts more quickly to a hot-spot but also can randomly reach a peak in an instance where it randomly lands on a spurious crossing of another focal point. By including several averages of differing time-constant this could give the designer the possibility of ignoring faster-responding values. The extra averages could also be of different metrics, P-squared and I being examples. Move decisions could then involve multiple metrics, for instance.

Figure 2:
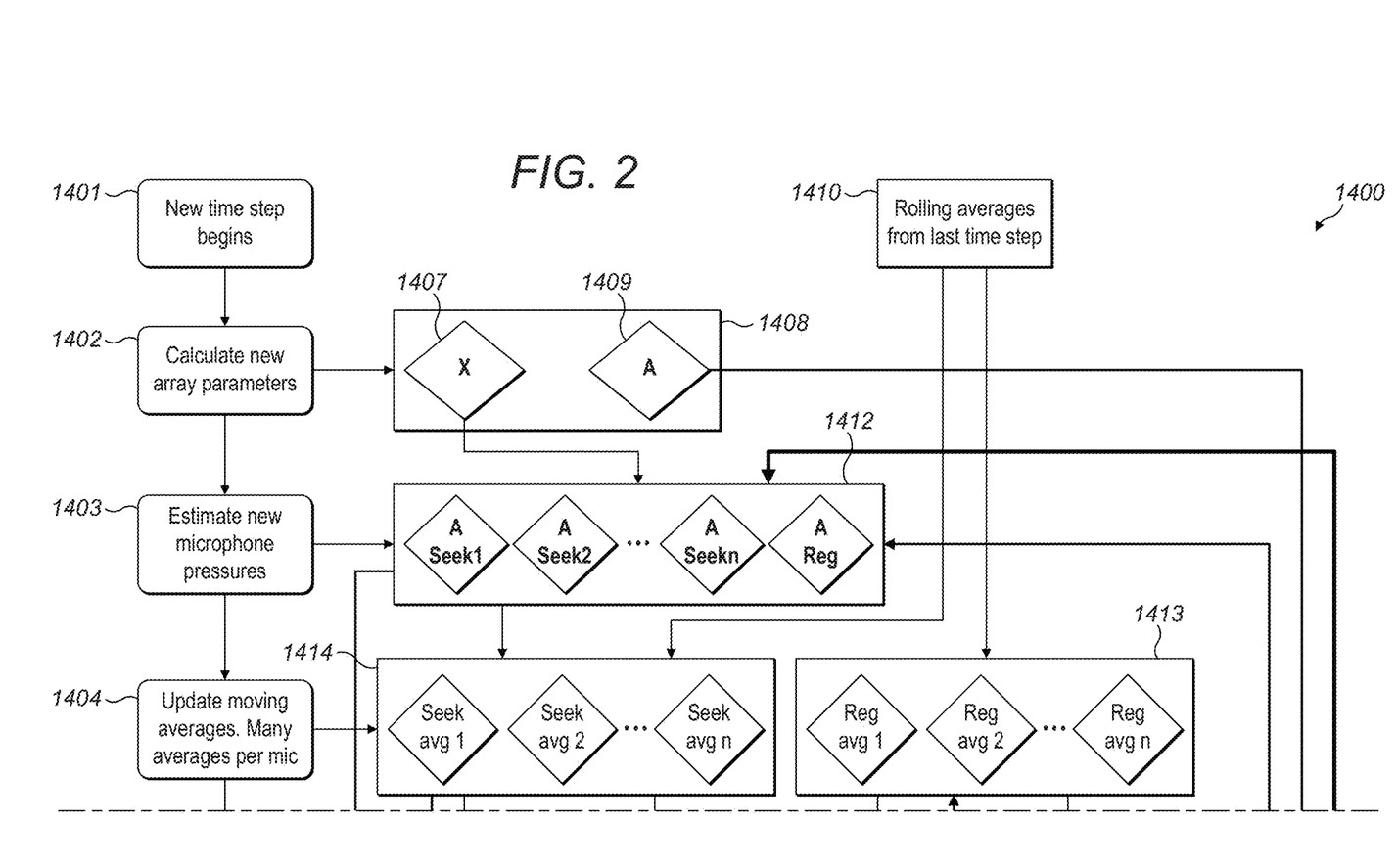
FIG. 2 shows a flowchart of an N-mic, N-average arrangement.

Turing to FIG. 2, shown are possibilities of a flowchart 1400 of an N-mic, N-average arrangement.

A new time step begins 1401 following by calculating new array parameters 1402. These parameters are then provided to the vectors 1408 (row vector A 1409 and column vector X 1407). The row vector A 1409 is provided to overwrite A_seek with A and reset move counter with a fixed minimum-n ($n_{fixed}$) plus additional random-length ($n_{random}$) 1421. The column vector X 1315 is provided to a group of A vectors 1412 (one or more A_seek and a A_reg).

Rolling averages from the last time step 1410 are sent to a group of seek avg 1414 and a group of reg avg 1413.

Calculating new array parameters 1402 are also provided to estimate new microphone pressures 1403, which is provided to the group of A vectors 1412. Data from the group of A vectors 1412 are sent to a group of seek avg 1414. The data from the group of seek avg 1414 and a group of reg avg 1413 are sent to take appropriate value for regulation 1416.

The data from the group of seek avg 1414 are sent to overwrite appropriate averages if specified and overwrite A_reg with the A_seek which triggered the move 1417. Data from the group of A vectors 1412 are also sent to overwrite appropriate averages if specified and overwrite A_reg with the A_seek which triggered the move 1417. This is then sent to the group of A vectors 1412 and the group of reg avg 1413.

In addition, data from the group of seek avg 1414 and the group of reg avg 1413 are compared 1415 and the greater value with margin is sent to overwrite appropriate averages if specified and overwrite A_reg with the A_seek which triggered the move 1417.

The values of estimate new microphone pressures 1403 are provided to update the moving averages with many averages per mic 1404, which is provided to: 1) the group of seek avg 1414; and 2) the move decision for Reg mic 1405 and then to the move decision for each mic 1406.

The counter is moved for each seek from the last step 1418 and then decremented 1419. If the counter is less than or equal to zero 1420, an instruction is sent to overwrite A_seek with A and reset move counter with a fixed minimum-n (n_fixed) plus additional random-length (n_random) 1421. In addition, if more one mic is $\Leftarrow 0$, add a specified value to all counters but one 1422.

V. Multiplexing

Phased arrays are capable of multiplexing spherical waves to create multiple simultaneous focus points. For this type of arrangement, each focus point could have one or more of its own, independent virtual microphones. In this case, the row-vector for each point would be considered separately from the perspective of mic-storage.

For regulation, one option is to use the output of the highest rolling pressure average to be as a global regulating maximum. Alternatively, each focus point could be regulated separately. Yet another option is to have every focus point have its own seek mic but only use one regulation mic. In this case the regulation mic would move to the location of the highest seek mic. In this case, focus points would all be regulated to the global maximum, as the regulation mic has no knowledge of which focus points are contributing to its average.

VI. Control

One use of the virtual microphone measurement is to attenuate the output of the array to satisfy a user-specified maximum SPL level. In one arrangement, the array can simply check against one of the microphones (such as the regulatory microphone) and adjust the output so that the next cycle is attenuated enough to correct the rolling average. This would be done by solving (2) for x for the desired $Avg_n$ and then using that value for output. This, unfortunately, can lead to sharp changes in the pressure field and can result in undesired audible sound.

One smoother method to feed the measured pressure back into the output is to set the pressure targets based upon the pressure goal divided by the highest virtual microphone pressure and let the value of 1 represent the pressure goal. In this way, when the measured pressure is far below the pressure goal, the output is free to exceed it. When the pressure is equal to the pressure goal, it sustains the output. When it is too high, the output is attenuated. This regulation approach yields smoother results as the virtual microphone pressure is naturally smoothed by its own rolling average.

Yet another method is to use a standard proportion-integral-differential (PID) controller. PID is a standard real-time control scheme used across all of control systems for decades. It is simple, flexible, and computationally efficient. In this context, we can use a simple PD (no integral term) controller to adjust the capping value based upon the P-squared value returned by the virtual microphone schemes presented above. We do not need the integral term as the rolling average accomplishes an integral-like effect without the downside of wind-up. Coefficients in the PID can be adjusted to balance speed of response with overshoot and audibility. A properly implemented PID controller approaches the limiting value at a controlled rate and does not ring excessively, thereby limiting unwanted audio.

In practice, the PID controller should use whichever is higher: the regulation mic P-squared (which is not being overwritten) or the seek mic P-squared which is using the small-alpha time constant.

VII. Additional Disclosure

1. Coupling a moving-average calculation with field estimates.
2. Using 2 virtual microphones in this arrangement with this relationship may represent the most computationally efficient manner to find hot spots in a quickly changing acoustic field.
3. An ultrasonic phased array composed of
A plurality of transducers with known relative positions and orientations;

A complex activation coefficient representing the magnitude and phase of the driving signal to a transducer;
A point of interest;
Computing the transducer complex field at the point of interest;
Multiplying the transducer complex field by the activation coefficient to return an estimate of the field at that point;
Incorporating this field estimate into a rolling average;
Dependent claims:
1. Using a newly generated activation coefficient and multiplying by the older transducer complex field for a new estimate.
2. Using this new estimate for the rolling average.

VIII. Conclusion

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has". "having," "includes". "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a". "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An ultrasonic phased array comprising:
    a plurality of transducers with known relative positions and orientations;
    at least one complex activation coefficient representing a magnitude and phase of a driving signal to at least one of the plurality of transducers;
    a point of interest;
    a processor for:
    1) Computing a transducer complex field from at least one of the plurality of transducers at the point of interest;
    2) Multiplying the transducer complex field by an activation coefficient to return a field estimate at the point of interest;
    3) incorporating the field estimate into a weighted average; and
    4) moving the point of interest at a distance composed of a fixed minimum length and a random length;
    wherein if the weighted average exceeds a pressure goal, the at least one complex activation coefficient has at least one of its real and imaginary components changed.

2. The ultrasonic phased array as in claim 1, wherein the field estimate is calculated using a squared magnitude.

3. The ultrasonic phased array as in claim 1, wherein the field estimate is calculated using a magnitude.

4. The ultrasonic phased array as in claim 1, wherein the field estimate is acted upon by a function before incorporating function output into a weighted average.

5. The ultrasonic phased array as in claim 1, wherein a plurality of versions of the transducer complex field are stored in the processor so that at least two of the plurality of versions of the transducer complex field are used with the least one complex activation coefficient to simultaneously estimate a plurality of points of interest.

6. The ultrasonic phased array as in claim 5, wherein a plurality of points of interest comprise a plurality of virtual microphone locations.

7. The ultrasonic phased array as in claim 6, wherein each of the plurality of virtual microphone captures its own weighted average.

8. The ultrasonic phased array as in claim 7, wherein at least one of the weighted average is calculated using a different function from others of the weighted averages.

9. The ultrasonic phased array as in claim 6, wherein at least one of the plurality of points of interest is changed when at least one weighted average exceeds a goal.

10. The ultrasonic phased array as in claim 1, wherein the transducer complex field comprises a previously calculated version of the transducer complex field.

11. The ultrasonic phased array as in claim 10, wherein the previously calculated version of the transducer complex field to be used is chosen based upon output of a weighted average from at least one virtual microphone.

12. The ultrasonic phased array as in claim 1, wherein the weighted average comprises an average of prior field estimates.

13. The ultrasonic phased array as in claim 1, wherein the weight average comprises a pressure goal divided by a highest virtual microphone pressure.

14. The ultrasonic phased array as in claim 1, wherein the activation coefficient is changed using a proportional-differential controller.

15. The ultrasonic phased array as in claim 14, wherein the proportion-differential controller adjusts the at least one complex activation coefficient value based on a squared pressure output value retuned by at least one of a virtual microphone and the weighted average.

16. The ultrasonic phased array as in claim 14, wherein coefficients of the proportion-differential controller are adjusted to a controlled rate that limits unwanted audio.

17. The ultrasonic phased array as in claim 14, wherein the proportion-differential controller uses the greater of: 1) a regulation virtual microphone squared pressure output; or 2) a seek virtual microphone squared pressure output.

18. The ultrasound phased array as in claim 1, wherein the random length is not less than the fixed minimum length.

* * * * *